United States Patent
Tagi

(10) Patent No.: US 9,761,933 B2
(45) Date of Patent: Sep. 12, 2017

(54) MILLIMETER WAVE ANTENNA AND RADAR APPARATUS FOR VEHICLE

(71) Applicant: Panasonic Intellectual Property Management Co., Ltd., Osaka (JP)

(72) Inventor: Hiroyoshi Tagi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 83 days.

(21) Appl. No.: 14/711,781

(22) Filed: May 14, 2015

(65) Prior Publication Data

US 2015/0349414 A1 Dec. 3, 2015

(30) Foreign Application Priority Data

May 27, 2014 (JP) ................................. 2014-109227

(51) Int. Cl.
| | | |
|---|---|---|
| *H01Q 1/42* | (2006.01) | |
| *H01Q 1/32* | (2006.01) | |
| *G01S 7/03* | (2006.01) | |
| *G01S 13/93* | (2006.01) | |
| *G01S 7/02* | (2006.01) | |

(52) U.S. Cl.
CPC ............. *H01Q 1/3283* (2013.01); *G01S 7/03* (2013.01); *G01S 13/931* (2013.01); *H01Q 1/422* (2013.01); *G01S 2007/027* (2013.01); *G01S 2013/9346* (2013.01); *G01S 2013/9389* (2013.01)

(58) Field of Classification Search
CPC .......... H01Q 1/42; H01Q 19/32; H01Q 13/18; H01P 1/16
USPC ................................. 343/872, 784, 754, 789
See application file for complete search history.

(56) References Cited

U.S. PATENT DOCUMENTS

2011/0248902 A1* 10/2011 Miyagawa ............... H01Q 1/42
                                                                  343/872
2015/0123872 A1*  5/2015 Fujita .................... G01S 13/931
                                                                  343/872

FOREIGN PATENT DOCUMENTS

| JP | 2003-010676 | 1/2003 |
| JP | 2006-140956 | 6/2006 |
| JP | 2006140956 A | * 6/2006 |

* cited by examiner

*Primary Examiner* — Dameon E Levi
*Assistant Examiner* — Collin Dawkins
(74) *Attorney, Agent, or Firm* — Wenderoth, Lind & Ponack, L.L.P.

(57) ABSTRACT

An millimeter wave antenna includes an antenna body adapted to transmit and receive an electromagnetic wave of a millimeter wave band; and a radome that covers a transmitting and receiving surface of the antenna body. The transmitting and receiving surface and the radorm are apart from each other and have a space therebetween. The radome includes a gap adapted to allow the electromagnetic wave of the millimeter wave band to pass through the gap. A radar apparatus for vehicle includes the millimeter wave antenna.

10 Claims, 5 Drawing Sheets

MILLIMETER WAVE ANTENNA AND RADAR APPARATUS FOR VEHICLE

BACKGROUND

1. Technical Field

The present disclosure relates to a millimeter wave antenna and a radar apparatus for vehicle.

2. Description of the Related Art

Millimeter wave antennas are used for radar apparatuses for vehicle, for example. Such a radar apparatus for vehicle is mounted in a vehicle, which is a mobile unit, and detects, for example, a direction, relative distance, and relative velocity of an obstacle, such as a mobile unit running ahead.

In recent years, prevention safety technologies for preventing accidents have been particularly attracting more and more attention. ACC (Adaptive Cruise Control system) that uses a 76 GHz band millimeter wave radar and ADAS (Advanced Driver Assistance System) such as a pre-crash safety system are already becoming standard equipment on luxury cars. In response to such increasing needs, standardization of a new radar band (79 GHz band) is being promoted, and the new radar band is expected to become available from fiscal year 2015.

The millimeter wave radar sends a millimeter electromagnetic wave in a desired direction, receives its reflected wave, and previously detects an object that can be an obstacle. In the millimeter wave radar, a planar patch antenna or a slot antenna formed in a waveguide transmits and receives an electromagnetic wave. A location best suited to install the antenna is considered an inside of a bumper that always faces a traveling direction of a vehicle, among nonmetallic exterior bodies that can pass the electromagnetic wave. Since the inside of a vehicle bumper is typically not a sealed space, rain or dust enters. Accordingly, in order to protect an antenna body, it is necessary to provide a radome for covering a front of a fixing portion to which the antenna body is attached. The radome itself also needs to have a certain amount of thickness and strength to secure durability and sealing performance.

In the radar apparatus for vehicle configured as describe above, a radar wave radiated from the antenna body passes through the radome and the bumper, and is radiated toward a survey object, and a reflected wave from the survey object will pass through the bumper and the radome, and will reach the antenna body.

Accordingly, the electromagnetic wave radiated from the antenna body passes through each of the radome and the bumper twice by returning to the antenna body, causing a problem of reflection loss and absorption loss resulting from the radome and the bumper. In a short-wavelength millimeter wave band in particular, influence of the reflection loss and the absorption loss is great. In order to solve such a problem, Patent Literature 1 (Japanese Patent No. 4,065, 268) and Patent Literature 2 (Unexamined Japanese Patent Publication No. 2003-10676) propose specifying a positional relationship between the radome and the bumper based on an electric length.

SUMMARY

One non-limiting and exemplary embodiment provides the millimeter wave antenna and radar apparatus for vehicle capable of reducing loss resulting from providing the radome, while securing the durability and/or sealing performance of the radome.

In one general aspect, the techniques disclosed here feature an millimeter wave antenna including: an antenna body including a transmitting and receiving surface, the antenna body being adapted to transmit and receive an electromagnetic wave of a millimeter wave band; and a radome that covers the transmitting and receiving surface of the antenna body, the transmitting and receiving surface and the radorm being apart from each other with a space therebetween, wherein the radome includes a gap adapted to allow the electromagnetic wave of the millimeter wave band to pass through the gap. It should be noted that general or specific embodiments may be implemented as an antenna, a device, an apparatus, a system, a method, or any selective combination thereof.

The millimeter wave antenna according to one exemplary embodiment of the present disclosure can reduce the loss resulting from providing the radome while securing the durability and sealing performance of the radome. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

It is difficult to specify a positional relationship between a radome and a bumper based on an electric length of an electromagnetic wave to be used and to control reflection loss for an existing vehicle or a vehicle that does not allow design changes to a thickness of the bumper for specification reasons. Accordingly, the present inventor has earnestly studied to provide a millimeter wave antenna having a good antenna characteristic, the antenna capable of reducing the reflection loss and absorption loss resulting from the radome.

In the millimeter wave antenna according to an exemplary embodiment of the present disclosure, the radome has a gap provided such that a transmitted or returning electromagnetic wave passes through the gap. This allows a propagation path through the material of the radome to be shortened, while a thickness of the entire radome including the gap is secured. Accordingly, the loss resulting from providing the radome can be reduced, while durability and sealing performance of the radome are secured.

This millimeter wave antenna is used, for example, in a radar apparatus for vehicle. The radar apparatus for vehicle is mounted in a vehicle that is a mobile unit, and detects, for example, a direction, relative distance, and relative velocity of an obstacle, such as a mobile unit that is running ahead.

The millimeter wave antenna according to exemplary embodiments of the present disclosure will be described below with reference to the drawings.

First Exemplary Embodiment

Figure 7:
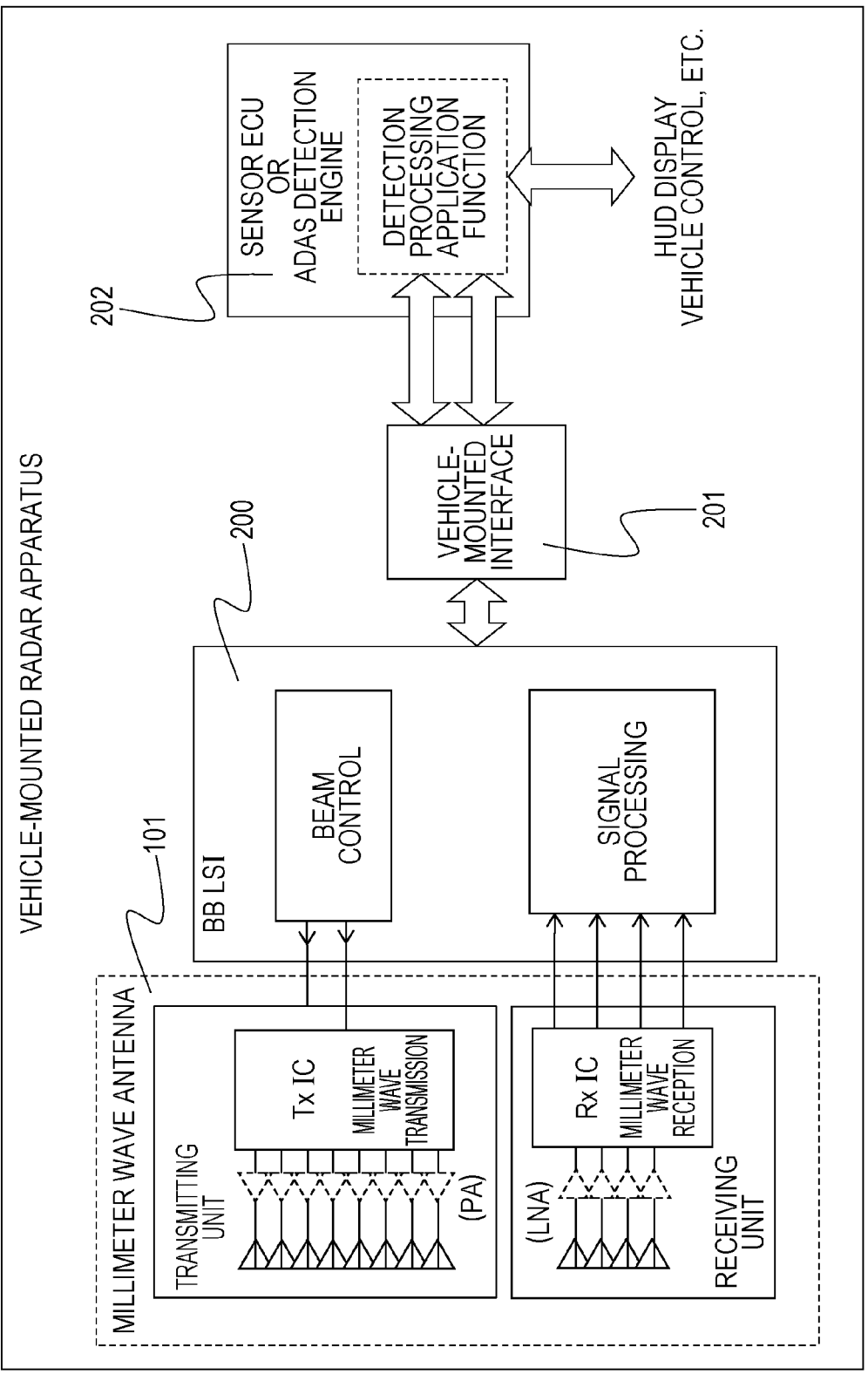
FIG. 7 is a block diagram illustrating a configuration of the radar apparatus for vehicle according to the first exemplary embodiment of the present disclosure.

FIG. 7 is a block diagram illustrating a schematic configuration of a radar apparatus for vehicle according to a first exemplary embodiment of the present disclosure. The radar apparatus for vehicle according to the first exemplary embodiment includes millimeter wave antenna 101 and baseband unit 200 for performing digital processing on a signal transmitted or received by millimeter wave antenna 101. Baseband unit 200 is implemented, for example, by an LSI, and calculates a velocity, distance, direction and the like of an object by performing digital processing on a signal received by a receiving unit of millimeter wave antenna 101. Baseband unit 200 may perform beam control of a transmitting unit of millimeter wave antenna 101. Baseband unit 200 is controlled by a detection processing application function of sensor ECU 202 via vehicle-mounted interface 201. In place of sensor ECU 202, an ADAS detection engine may be used. Information from the detection processing application function may be displayed on an onboard HUD (Head Up Display), and may be used for brake control of the vehicle.

Figure 1:
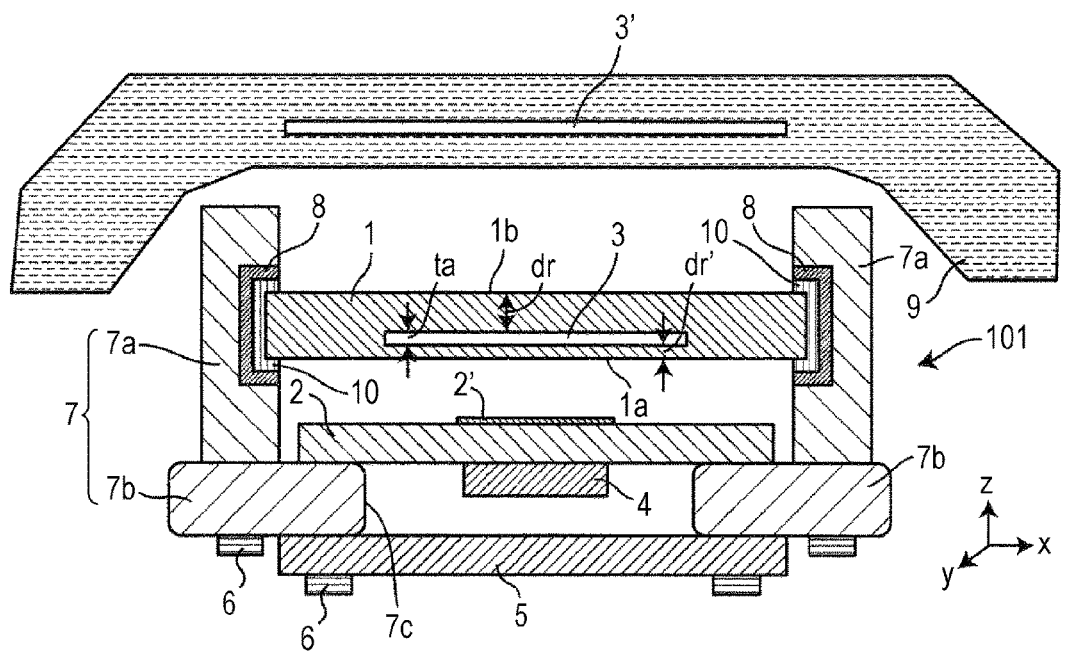
FIG. 1 is a cross-sectional view of a millimeter wave antenna according to a first exemplary embodiment of the present disclosure.

FIG. 1 is a cross-sectional view schematically illustrating a configuration of millimeter wave antenna 101 according to the first exemplary embodiment of the present disclosure. In the radar apparatus for vehicle of the first exemplary embodiment, millimeter wave antenna 101 is installed within bumper 9. Millimeter wave antenna 101 includes transmitting/receiving antenna mounting substrate 2. Transmitting/receiving antenna mounting substrate 2 has, for example, system LSI 4 mounted on a lower surface and antenna unit 2' formed on an upper surface. Transmitting/receiving antenna mounting substrate 2 is fixed to fixing stand 7 as follows. System LSI 4 is, for example, an RF chip.

Fixing stand 7 includes bottom 7b having aperture 7c that passes through bottom 7b from an upper surface to a lower surface, and frame 7a provided on the upper surface of bottom 7b to surround aperture 7c. Transmitting/receiving antenna mounting substrate 2 is provided on the upper surface of bottom 7b. Specifically, an outer circumference of the lower surface of transmitting/receiving antenna mounting substrate 2 is fixed to a circumference of aperture 7c on the upper surface of bottom 7b such that system LSI 4 mounted on the lower surface of transmitting/receiving antenna mounting substrate 2 is located in aperture 7c. Frame 7a is fixed to the upper surface of bottom 7b with, for example, screw 6, to surround transmitting/receiving antenna mounting substrate 2.

Although in the present first exemplary embodiment, the millimeter wave antenna is configured by using transmitting/receiving antenna mounting substrate 2 that has antenna unit 2' formed on the upper surface, the present disclosure is not limited to this configuration, and can employ various antenna structures. In the present specification, an antenna structure including transmitting/receiving antenna mounting substrate 2 is generically referred to as an antenna body.

In the radar apparatus for vehicle, insulator 5 is fixed on the lower surface of bottom 7b, for example, by using screw 6, to stop up aperture 7c for protection of transmitting/receiving antenna mounting substrate 2. Furthermore, radome 1 is attached to frame 7a with radome fixing rubber 8 at a position spaced a predetermined distance apart from antenna unit 2' for protection of transmitting/receiving antenna mounting substrate 2. Wave absorbing layer 10 is provided in a part of radome fixing rubbers 8 (for example, between radome fixing rubber 8 and radome 1).

As described above, transmitting/receiving antenna mounting substrate 2 is provided and protected within an enclosed space (also referred to as antenna protective space) formed by fixing stand 7, insulator 5 that is provided on the lower surface of bottom 7b and for stopping up aperture 7c, and radome 1 that covers a front of transmitting/receiving antenna mounting substrate 2. Millimeter wave antenna 101 used in the radar apparatus for vehicle is required to endure severe outside environments including the use under bad weather conditions such as rain or snowfall, and exposure to physical impacts, such as a collision with a pebble, during traveling. Accordingly, components such as fixing stand 7 and radome 1 for protecting transmitting/receiving antenna mounting substrate 2 (that is, the antenna body) are required to have mechanical strength equal to or greater than a certain level, in addition to sealing performance for preventing entry of particulates. In the present specification, the sealing performance refers only to prevention of entry of water, particulates and so forth when millimeter wave antenna 101 is mounted in a vehicle. For example, the sealing performance for maintaining vacuum conditions is not necessarily required.

Meanwhile, since radome 1 covers the front of transmitting/receiving antenna mounting substrate 2 and the millimeter wave radiated from antenna unit 2' passes through radome 1, it is necessary to minimize absorption loss and reflection loss of radome 1. Therefore, in the present first exemplary embodiment, radome 1 has gap 3 provided such that the transmitted or returning electromagnetic wave passes through gap 3. Gap 3 is desirably formed in an area where substantially all the millimeter wave radiated from antenna unit 2' passes through. Specifically, gap 3 is formed in consideration of directivity of antenna unit 2'. Specifically, gap 3 is provided, for example, in an area larger than a projection area when the antenna body is projected in parallel onto a first exterior surface of radome 1 in a radiation direction of the electromagnetic wave.

In the present first exemplary embodiment, providing gap 3 in radome 1 allows a thickness (that is, dr+dr' in FIG. 2) of the structure that constitutes radome 1 to be reduced without reduction of thickness t of entire radome 1. This allows maintaining the sealing performance of the antenna protective space and securing mechanical strength of radome 1 while reducing wave absorption loss caused by the structure that constitutes radome 1.

That is, in order to maintain the sealing performance of the antenna protective space, a certain amount of thickness is required in an attachment portion of radome 1 to frame 7a. The present inventor's knowledge shows that securing some thickness of radome 1 in a vicinity of the attachment portion of radome 1 to frame 7a allows maintaining the mechanical strength of radome 1 equal to or greater than a certain level. Accordingly, providing gap 3 at a position except an end in the vicinity of the attachment portion of radome 1 allows maintaining the sealing performance of the antenna protective space and securing the mechanical strength of radome 1, while reducing the wave absorption loss caused by the structure that constitutes radome 1.

Specifically, in consideration of a characteristic of a material that constitutes radome 1, for example, a thickness of 1.0 mm or more, desirably 2.0 mm or more is secured in the attachment portion of radome 1 to frame 7a. Furthermore, in order to reduce the reflection loss resulting from providing radome 1, the millimeter wave antenna used in the radar apparatus for vehicle according to the present first exemplary embodiment is desirably formed as follows.

Figure 2:
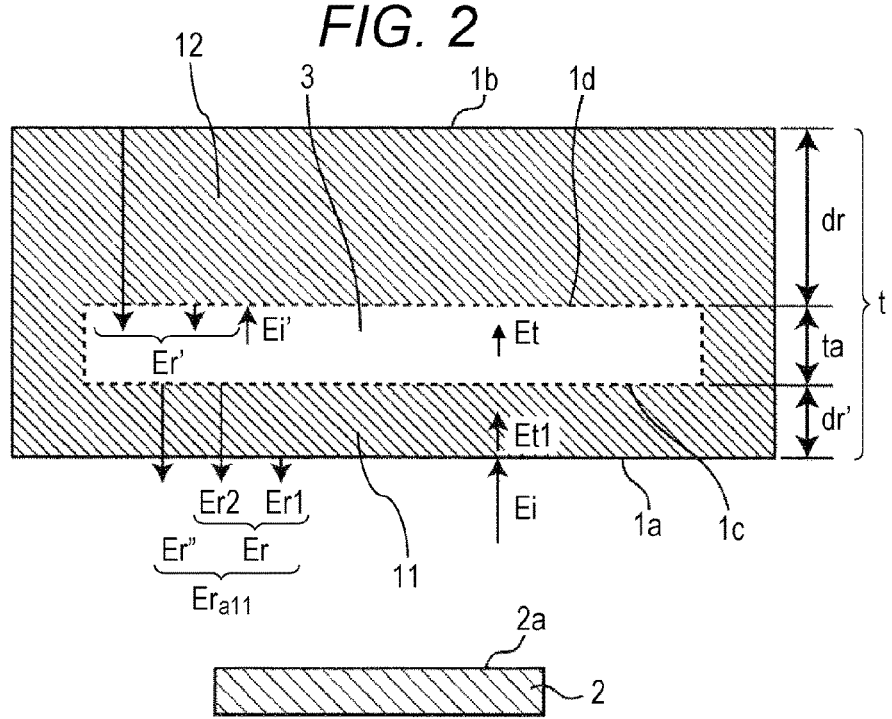
FIG. 2 is a cross-sectional view schematically illustrating a configuration of a radome in the millimeter wave antenna of FIG. 1.

A principle of reducing the reflection loss will be described with reference to FIG. 2. As illustrated in FIG. 2, radome 1 is provided to face, in parallel, transmitting/receiving antenna forming surface 2a (a surface on which antenna unit 2' is formed) of transmitting/receiving antenna mounting substrate 2. It is assumed here that radome 1 is made of, for example, a synthetic resin, and that parameters of the synthetic resin include relative dielectric constant c, guide wavelength λ, thickness D, and wave number k (=2π/λ). The guide wavelength λ is provided as $\lambda=\lambda_0/\in^{1/2}$ when the wavelength in a vacuum is $\lambda_0$.

In the following description, an area located between first exterior surface 1a on a transmitting/receiving antenna forming surface 2a side and gap 3 in radome 1 is defined as first area 11, whereas an area sandwiched between second exterior surface 1b on a side distant from the antenna and gap 3 in radome 1 is defined as second area 12. An interface between first area 11 and gap 3 is defined as first interface 1c, whereas an interface between gap 3 and second area 12 is defined as second interface 1d. A clearance of gap 3, that is, a distance between first interface 1c and second interface 1d is defined as ta. Furthermore, reflection coefficients with respect to the millimeter wave radiated from antenna unit 2' on first exterior surface 1a, second exterior surface 1b, first interface 1c, and second interface 1d are all F.

First, reflected waves from first exterior surface 1a and first interface 1c related to first area 11 will be considered. The reflected wave from first exterior surface 1a and the reflected wave from first interface 1c are synthesized and incident on antenna unit 2'. The reflected wave related to first area 11 is a synthesized wave of a first reflected wave and a second reflected wave. The first reflected wave is part of the electromagnetic wave radiated from antenna unit 2', and is reflected from first exterior surface 1a. The second reflected wave is also part of the electromagnetic wave radiated from antenna unit 2'. The second reflected wave passes through first area 11 and is reflected from first interface 1c. Accordingly, the first reflected wave and the second reflected wave are desirably synthesized at least in different phases. More desirably the first reflected wave and the second reflected wave are synthesized with a phase difference in a range from 0.9π to 1.1π. Even more desirably, the first reflected wave and the second reflected wave are synthesized in an opposite phase with the phase difference of π.

Specifically, thickness dr' of first area 11 is set such that (a) the phase of the first reflected wave and the phase of the second reflected wave on first exterior surface 1a differ from each other, (b) desirably, the first reflected wave and the second reflected wave have the phase difference in the range from 0.9π to 1.1π on first exterior surface 1a, and (c) even more desirably, the phase difference between the first reflected wave and the second reflected wave on first exterior surface 1a is π.

More specific description will be provided with reference to FIG. 2. First, when plane wave Ei radiated from antenna unit 2' is incident on radome 1 perpendicularly from first exterior surface 1a, part of the plane wave is reflected because radome 1 and air have different wave impedance. First reflected wave Er1 that is reflected from first exterior surface 1a is expressed by Equation (1):

$$Er1 = Ei \times \Gamma \quad (1)$$

Transmitted component Et1 that propagates through first area 11 is expressed by Equation (2):

$$Et1 = Ei \times (1 - |\Gamma|^2)^{1/2} \quad (2)$$

When transmitted component Et1 reaches first interface 1c, part of transmitted component Et1 is reflected from first interface 1c at which a dielectric constant changes discontinuously.

When second reflected wave Er2 propagates through first area 11 and reaches first exterior surface 1a, second reflected wave Er2 is expressed by the following equation:

$$Er2 = -Ei \times \Gamma \times (1-|\Gamma|^2)^{1/2} \times e^{-2j\beta}$$

When $|\Gamma|^2 \ll 1$ holds, second reflected wave Er2 is expressed by Equation (3):

$$Er2 \approx -Ei \times \Gamma \times e^{-2j\beta} \quad (3)$$

However, the electric length β of first area 11 in Equation (3) is expressed by the following equation:

$$\beta = k \times dr'$$

Therefore, synthesized reflected wave Er related to first area 11 on first exterior surface 1a of radome 1 is expressed by Equation (4):

$$Er = Er1 + Er2 = Ei \times \Gamma \times (1 - e^{-2j\beta}) \quad (4)$$

As is evident from Equation (4), when $e^{-2j\beta}$ becomes −1, that is, when the electric length β becomes an odd multiple of π/2, the reflected waves will be synthesized in an identical phase, and synthesized reflected wave Er is maximized. When $e^{-2j\beta}$ becomes +1, that is, when β becomes an integral multiple of π, $(1-e^{-2j\beta})=0$ holds, and synthesized reflected wave Er that is reflected from first area 11 is minimized.

Accordingly, in the present first exemplary embodiment, thickness dr' of first area 11 is desirably set to avoid the electric length β from becoming an odd multiple of π/2 such that the first reflected wave and the second reflected wave are not synthesized in an identical phase, and the first reflected wave and the second reflected wave are desirably synthesized with different phases.

In addition, thickness dr' of first area 11 is desirably set to cause the phase difference to become in the range from 0.9π to 1.1π such that the first reflected wave and the second reflected wave on first exterior surface 1a are substantially synthesized in an opposite phase. More desirably, thickness dr' of first area 11 is set such that the first reflected wave and the second reflected wave are synthesized in an opposite phase.

For example, in order to synthesize the first reflected wave and the second reflected wave in an opposite phase, thickness dr' of first area 11 is set to satisfy Equation (5):

$$dr' = n\pi/k = n\lambda/2 \quad (5)$$

where n is an integer, and λ is a guide wavelength within first area 11.

In order to synthesize the first reflected wave and the second reflected wave on first exterior surface 1a substantially in an opposite phase, thickness dr' of first area 11 is set to satisfy Equation (6):

$$dr' = (n\pi \pm 0.1\pi)/k = (n \pm 0.1)\lambda/2 \quad (6)$$

where n is an integer.

Next, the reflected waves from second interface 1d and second exterior surface 1b related to second area 12 are considered. The reflected wave from second interface 1d and the reflected wave from second exterior surface 1b are synthesized, pass through gap 3 and first area 11, and are incident on antenna unit 2'. The reflected wave related to second area 12 is a synthesized wave of a third reflected wave and a fourth reflected wave. The third reflected wave is part of electromagnetic wave radiated from antenna unit 2'. The third reflected wave passes through first area 11 and is reflected from second interface 1d. The fourth reflected wave is also part of electromagnetic wave radiated from antenna unit 2'. The fourth reflected wave passes through first area 11 and second area 12, and is reflected from second exterior surface 1b. Accordingly, the third reflected wave and the fourth reflected wave are desirably synthesized at least in different phases. More desirably, the third reflected wave and the fourth reflected wave are synthesized with the phase difference in the range from 0.9π to 1.1π. Even more desirably, the third reflected wave and the fourth reflected wave are synthesized with the phase difference of π.

Specifically, thickness dr of second area 12 is set such that (a) the third reflected wave and the fourth reflected wave are radiated into gap 3 in different phases, (b) desirably, the third reflected wave and the fourth reflected wave are radiated into gap 3 with the phase difference in the range from 0.9π to 1.1π, and (c) even more desirably, the third reflected wave and the fourth reflected wave are radiated into gap 3 with the phase difference π.

More specific description will be provided based on changes in an electric field with reference to FIG. 2. First, component Et that passes through first area 11 is expressed by Equation (7):

$$Et = Et1 \times (1 - |\Gamma|^2)^{1/2} \times e^{-j\beta}$$
$$= Ei \times (1 - |\Gamma|^2) \times e^{-j\beta} \quad (7)$$

When transmitted component Et propagates through gap 3 and reaches second interface 1d, component Ei' is expressed by Equation (8):

$$Ei' = Et \times e^{-jT} \quad (8)$$

where T (electric length in free space) = $k_0 \times$ ta.

Here, k0 represents a wave number in free space. Reflected synthesized component Er' with respect to incidence component Ei' can be expressed by Equation (9), similarly to Equation (4) described above:

$$Er' = Ei' \times \Gamma \times (1 - e^{-2j\gamma}) \quad (9)$$

where γ (electric length) = k×dr

Er' is a synthesized reflected wave obtained by synthesis of the third reflected wave reflected from second interface 1d and the fourth reflected wave reflected from second exterior surface 1b. As is evident from Equation (9), when $e^{-2j\gamma}$ becomes −1, that is, when the electric length γ becomes an odd multiple of π/2, the third reflected wave and the fourth reflected wave are synthesized in an identical phase, and synthesized reflected wave Er' is maximized. When $e^{-2j\gamma}$ becomes +1, that is, when γ becomes an integral multiple of π, $(1 - e^{-2j\gamma}) = 0$ holds, and synthesized reflected wave Er' reflected from second area 12 is minimized.

Therefore, according to the present first exemplary embodiment, thickness dr of second area 12 is desirably set such that the electric length γ is not an odd multiple of π/2, and that the third reflected wave and the fourth reflected wave are synthesized with different phases.

In addition, thickness dr of second area 12 is more desirably set such that the third reflected wave and the fourth reflected wave are radiated into gap 3 with the phase difference in the range from 0.9π to 1.1π, and that the third reflected wave and the fourth reflected wave are synthesized substantially in an opposite phase. Thickness dr of second area 12 is even more desirably set such that the third reflected wave and the fourth reflected wave are radiated into gap 3 with the phase difference of π, and that the third reflected wave and the fourth reflected wave are synthesized in an opposite phase.

For example, in order to synthesize the third reflected wave and the fourth reflected wave in gap 3 in an opposite phase, thickness dr of second area 12 is set to satisfy Equation (10):

$$dr = n\pi/k = n\lambda/2 \quad (10)$$

where n is an integer, and λ is a guide wavelength within second area 12.

In order to synthesize the third reflected wave and the fourth reflected wave in gap 3 substantially in an opposite phase, thickness dr of second area 12 is set to satisfy Equation (11):

$$dr = (n\pi \pm 0.1\pi)/k = (n \pm 0.1)\lambda/2 \quad (11)$$

where n is an integer.

Reflected component Er' that is synthesized in gap 3 propagates through gap 3, passes through first area 11, and returns to a transmitting/receiving antenna mounting substrate 2 side. Component Er" of returned component Er' is expressed by Equation (12):

$$Er'' = Er' \times e^{-jT-j\beta} \quad (12)$$

Accordingly, total reflected wave Erall that returns to the transmitting/receiving antenna mounting substrate 2 side is expressed by Equation (13):

$$Erall = Er + Er'' \quad (13)$$
$$= Ei \times \Gamma[(1 - e^{-2j\beta}) + (1 - e^{-2j\gamma}) \times e^{-jT-j\beta}]$$

From Equation (13), reflectance R can be expressed by Equation (14):

$$R = Erall/Ei \quad (14)$$
$$= \Gamma \times [(1 - e^{-2j\beta}) + (1 - e^{-2j\gamma}) \times e^{-jT-j\beta}]$$

According to the present first exemplary embodiment, minimizing reflectance R can minimize the reflection loss of the entire antenna. A condition for achieving minimization of the reflection loss is to make the electric length β and electric length γ of the respective areas of radome 1 divided by gap 3 equal to an integral multiple of π. Under this condition, total reflected wave Erall of Equation (13) described above is expressed by the following equation:

$$Erall = Er + Er''$$
$$= Ei\Gamma[(1-1) + (1-1)e^{-jT}]$$
$$= 0$$

Thus, an ideal situation of no reflection loss can be achieved regardless of gap width ta.

Meanwhile, the absorption loss A is expressed by Equation (15):

$$A = 3.34 \times X \times (f \times \mu_r \times \sigma_r)^{1/2} \qquad (15)$$

X denotes the thickness of the exterior body, such as the radome or the bumper, f denotes a frequency, $\mu_r$ denotes relative permeability of the exterior body, and $\sigma_r$ denotes conductivity of the exterior body. Equation (15) indicates that the absorption loss becomes larger in proportion to X and $\mu_r$. In order to control the absorption loss A, it is effective to decrease a proportion of the exterior body to a path through which the millimeter wave propagates. For example, when the proportion of the exterior body becomes half by forming a gap, the absorption loss also becomes half.

Based on the above description, a specific configuration for reducing the reflection loss and absorption loss of radome 1 will be described.

First Aspect

As is evident from the above description, in principle, the reflection loss can be minimized and the absorption loss in first area 11 and second area 12 can be reduced, by setting thickness dr' of first area 11 such that the electric length β becomes an integral multiple of π, by setting thickness dr of second area 12 such that the electric length γ becomes an integral multiple of π, and by reducing the thickness of the sum of thickness dr' of first area 11 and thickness dr of second area 12.

Based on the above concept, thickness dr' of first area 11 and thickness dr of second area 12 are each set to λ/2 in the radome of the first aspect. That is, the radome of the first aspect is a radome in which n=1 to minimize the thickness out of the thicknesses that satisfy Equations (5) and (10), such that the reflection loss is minimized and the absorption loss caused by a material of the radome is reduced as much as possible. In view of the reflection loss, since gap 3 does not affect the reflection loss, distance ta of the clearance of gap 3 can be arbitrarily set such that the thickness of the entire radome becomes a desired thickness. The radome of the first aspect can effectively control the reflection loss when the radome is constituted of a material that allows large reflection on the first and second exterior surfaces and on the first and second interfaces, for example, a material having a relatively large dielectric constant.

Second Aspect

In the radome of the second aspect, in order to control the absorption loss due to the material of the radome more than in the radome of the first aspect, one of thickness dr' of first area 11 and thickness dr of second area 12 is set to λ/2, and the other thickness is set thinner than λ/2. In the radome of the second aspect, in order to secure mechanical strength, thickness dr of second area 12 located on a bumper side is set to λ/2, and thickness dr' of first area 11 is thin enough that first area 11 does not affect the antenna characteristic. Here, thin thickness dr' of the first area that does not affect the antenna characteristic refers to thickness dr' of the first area equal to or less than 0.05, for example. Since gap 3 does not affect the reflection loss, and the absorption loss due to gap 3 is extremely small, distance ta of the clearance of gap 3 can be arbitrarily set such that the thickness of the entire radome becomes a desired thickness.

Such a configuration allows reduction of the absorption loss significantly while the reflection loss is reduced. The radome of the second aspect can effectively control the absorption loss when the radome is constituted of a material capable of making reflection from the first and second exterior surfaces and from the first and second interfaces relatively small, for example, a material having a relatively small dielectric constant.

A simulation has verified the antenna characteristic in the cases where the radome of the first aspect is used and where the radome of the second aspect is used. An electromagnetic field analysis solver is used for the simulation.

Simulation 1 of the First Aspect Radome

In simulation 1, a radome having the entire thickness of 2.5 mm is assumed, and a simulation is performed on a radome in which gap 3 is formed according to the present exemplary embodiment, and on a radome of a comparative example without a gap. In simulation 1, thickness dr' of first area 11 is set such that the electric length β of first area 11 becomes π, and thickness dr of second area 12 is set such that the electric length γ of second area 12 becomes π. Specifically, the dielectric constant ∈ of a material that constitutes the radome is 3.5, width dr' of first area 11 and width dr of second area 12 are each 1.0 mm, and width to of gap 3 is 0.5 mm.

Figure 5A:
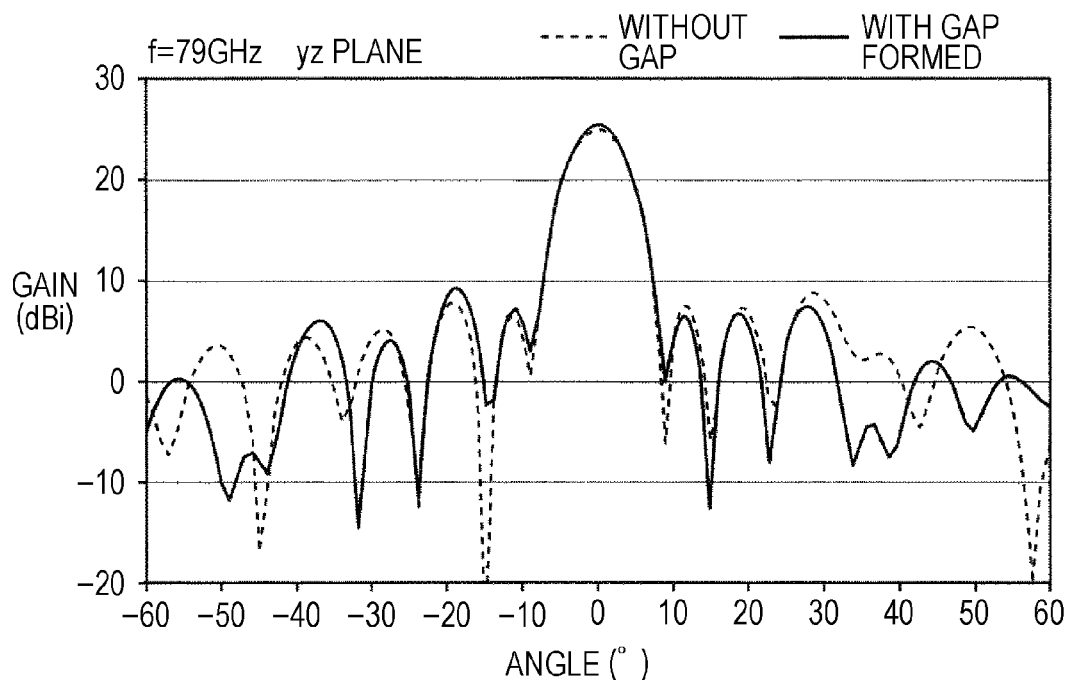
FIG. 5A is a graph illustrating a simulation result of an antenna characteristic in a radar apparatus for vehicle using a first aspect radome in the first exemplary embodiment, and illustrates a gain versus radiation angle in a yz plane.
Figure 5B:
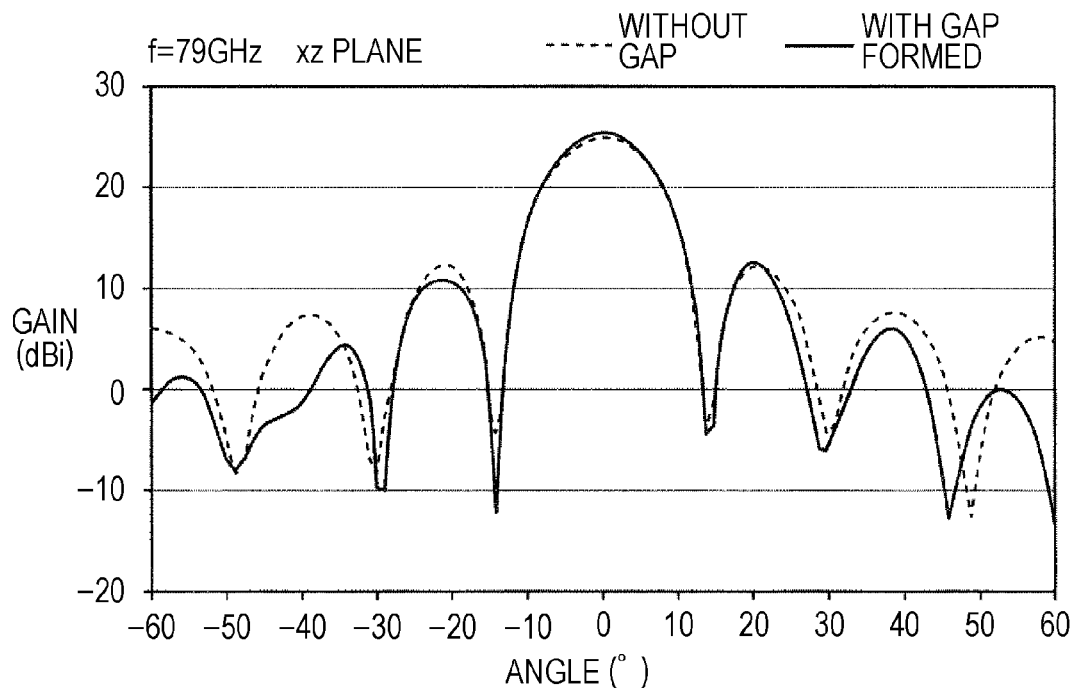
FIG. 5B is a graph illustrating the simulation result of the antenna characteristic in the radar apparatus for vehicle using the first aspect radome in the first exemplary embodiment, and illustrates the gain versus radiation angle in a xz plane.

FIG. 5A and FIG. 5B each illustrate a simulation result. FIG. 5A illustrates gain versus radiation angle in a yz plane, which is a plane perpendicular to a cross-section of transmitting/receiving antenna mounting substrate 2 and perpendicular to a transmitting/receiving antenna forming plane in FIG. 1. FIG. 5B illustrates gain versus radiation angle in a xz plane, which is a plane parallel to the cross-section of transmitting/receiving antenna mounting substrate 2 in FIG. 1. As the characteristic, while the gain is 25.0 dBi in the comparative example where no gap is formed, the gain is 25.5 dBi in the present exemplary embodiment where gap 3 is formed, and the performance improves by 0.5 dBi in the present exemplary embodiment. While a side lobe level in the yz plane is −16.1 dB in the comparative example where no gap is formed, the side lobe level is −16.1 dB in the present exemplary embodiment where gap 3 is formed, which provides equal results. While the side lobe level in the xz plane is −12.6 dB in the comparative example where no gap is formed, the side lobe level is −12.7 dB in the present exemplary embodiment where gap 3 is formed, which provides almost equal results.

Simulation 2 of the Second Aspect Radome

In simulation 2, a radome having the entire thickness of 1.6 mm is assumed, and a simulation is performed on a radome in which gap 3 is formed according to the present exemplary embodiment, and on a radome of the comparative example without a gap. In simulation 2, thickness dr' of first area 11 is set to be thin, and thickness dr of second area 12 is set such that the electric length γ of second area 12 becomes γ. Specifically, the dielectric constant ∈ of the material that constitutes the radome is 3.5, width dr' of first area 11 is 0.1 mm, and width dr of second area 12 is 1.0 mm. Width to of gap 3 is 0.5 mm.

Figure 6A:
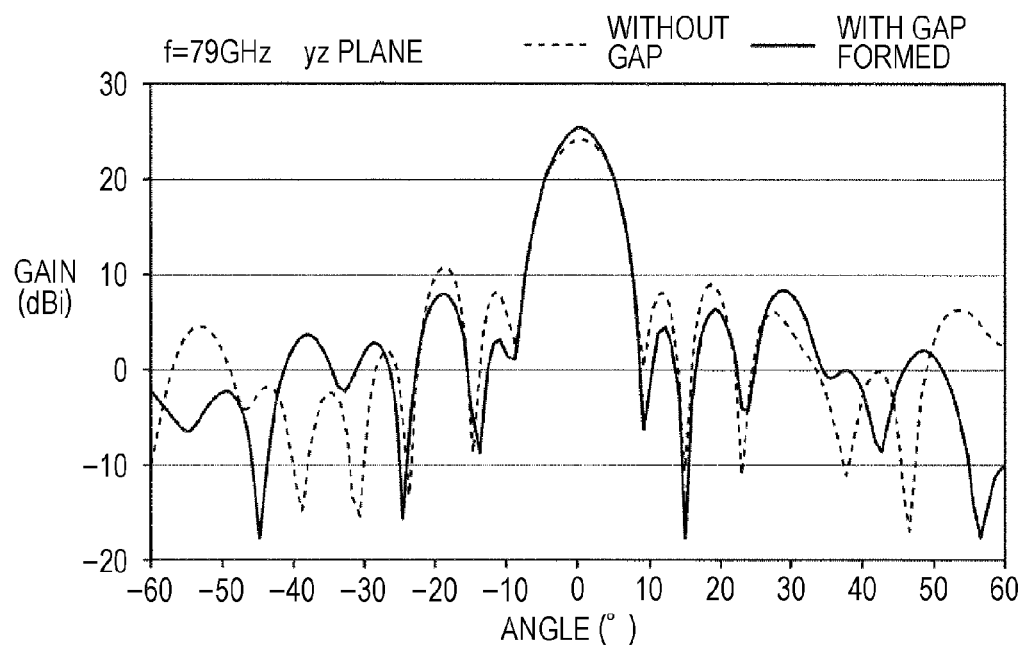
FIG. 6A is a graph illustrating the simulation result of the antenna characteristic in the radar apparatus for vehicle using a second aspect radome in the first exemplary embodiment, and illustrates the gain versus radiation angle in the yz plane.
Figure 6B:
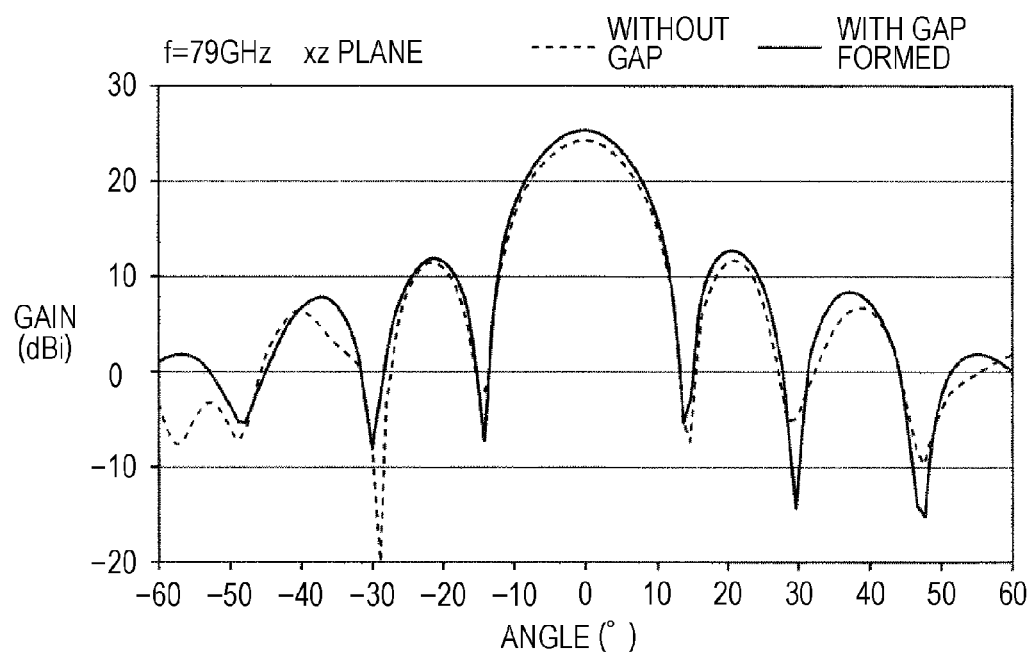
FIG. 6B is a graph illustrating the simulation result of the antenna characteristic in the radar apparatus for vehicle using the second aspect radome in the first exemplary embodiment, and illustrates the gain versus radiation angle in the xz plane.

FIG. 6A and FIG. 6B each illustrate a simulation result. FIG. 6A illustrates gain versus radiation angle in the yz plane, whereas FIG. 6B illustrates gain versus radiation angle in the xz plane. As the characteristic, while the gain is 24.3 dBi in the comparative example where no gap is formed, the gain is 25.4 dBi in the present exemplary embodiment where gap 3 is formed, and the performance improves by 1.1 dBi in the present exemplary embodiment. While the side lobe level in the yz plane is −13.5 dB in the comparative example where no gap is formed, the side lobe level is −16.9 dB in the present exemplary embodiment where gap 3 is formed, and the performance improves by 3.4 dB in the present exemplary embodiment. While the side lobe level in the xz plane is −12.4 dB in the comparative example where no gap is formed, the side lobe level is −12.6 dB in the present exemplary embodiment where gap 3 is formed, which provides almost equal results.

These simulation results verify that use of the radome with a gap provided according to the present disclosure is effective in improving the antenna characteristic. In addition, these simulation results show that the second aspect is superior to the first aspect. However, since the characteristic varies depending on dielectric properties (that is, relative dielectric constant, dielectric dissipation factor, and the like) of a material that constitutes the radome, it is desirable to switch the aspects in accordance with the characteristic required for the radome, as described above.

Radome 1 described above may be integrally formed of first area 11, second area 12, and a portion surrounding gap 3, and may be formed by lamination of a plurality of same types or different types of dielectric plates. Specifically, a dielectric frame plate having a through aperture formed corresponding to gap 3 is provided and laminated between a first dielectric plate including first area 11 and a second dielectric plate including second area 12, so that radome 1 can be formed. This configuration makes it possible to form the second dielectric plate on the bumper 9 side by using a dielectric that is superior in impact resistance to the first dielectric plate on the transmitting/receiving antenna mounting substrate 2 side. When the second dielectric plate on the bumper 9 side is thicker than the first dielectric plate on the transmitting/receiving antenna mounting substrate 2 side, and when the second dielectric plate uses a material excellent in impact resistance, required mechanical strength can be secured more effectively, and radome 1 can have a structure with stronger resistance to impact caused by an individual substance, such as a pebble, entering the bumper and colliding with radome 1.

The first dielectric plate, the second dielectric plate, and the dielectric frame plate may not be bonded but may be stacked and fixed to fixing stand 7. Such a fixing structure can prevent a warp from occurring, for example, even if the first dielectric plate, the second dielectric plate, and the dielectric frame plate are formed of materials that differ from one another.

The configuration of the present first exemplary embodiment in which gap 3 is provided in radome 1 can be applied to bumper 9, and can provide a similar effect. In this case, in order to cover the millimeter wave that passes through radome 1, the length of gap 3' formed in bumper 9 in a lateral direction (that is, y direction of FIG. 1) and in a longitudinal direction (that is, x direction of FIG. 1) is desirably larger than the size of gap 3 formed in radome 1. In other words, the projection area produced by projection of gap 3' onto first exterior surface 1a of radome 1 is desirably larger than the projection area produced by projection of gap 3. This makes it possible to enjoy an effect similar to an effect of radome 1 without loss.

Second Exemplary Embodiment

Figure 3:
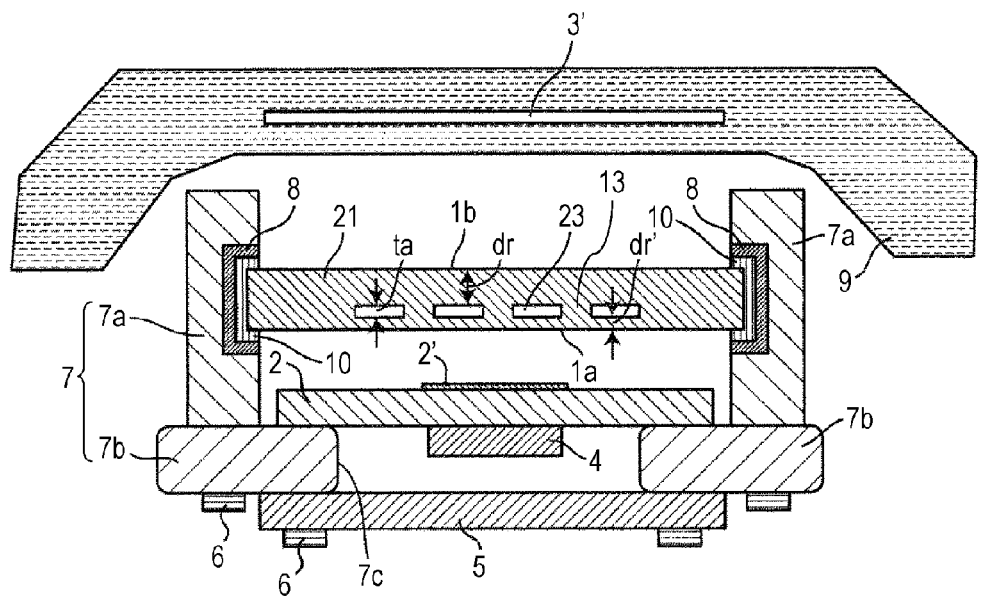
FIG. 3 is a cross-sectional view of a millimeter wave antenna according to a second exemplary embodiment of the present disclosure.

FIG. 3 is a cross-sectional view illustrating a configuration of an antenna for vehicle according to a second exemplary embodiment of the present disclosure. The antenna for vehicle of the second exemplary embodiment is formed in a similar manner to the antenna for vehicle of the first exemplary embodiment, except for a structure of radome 21. Radome 21 of the second exemplary embodiment differs from radome 1 of the first exemplary embodiment in that support 13 for maintaining space between first area 11 and second area 12 is provided within gap 23. Support 13 inhibits gap 23 provided in radome 21 from reducing mechanical strength of radome 23. Accordingly, support 13 may be formed of a plurality of cylinders, or may be grid-pattern bulkheads. When support 13 is bulkheads, gap 23 will be divided into a plurality of portions. In radome 21 of the antenna for vehicle of the second exemplary embodiment, thickness dr' of first area 11, thickness dr of second area 12, and clearance to of gap 23 are set in a similar manner to radome 1 of the first exemplary embodiment.

Radome 21 of the second exemplary embodiment configured as described above can inhibit degradation of an antenna characteristic in a similar manner to radome 1 of the first exemplary embodiment, and can further have high mechanical strength as compared with radome 1 of the first exemplary embodiment.

Third Exemplary Embodiment

Figure 4:
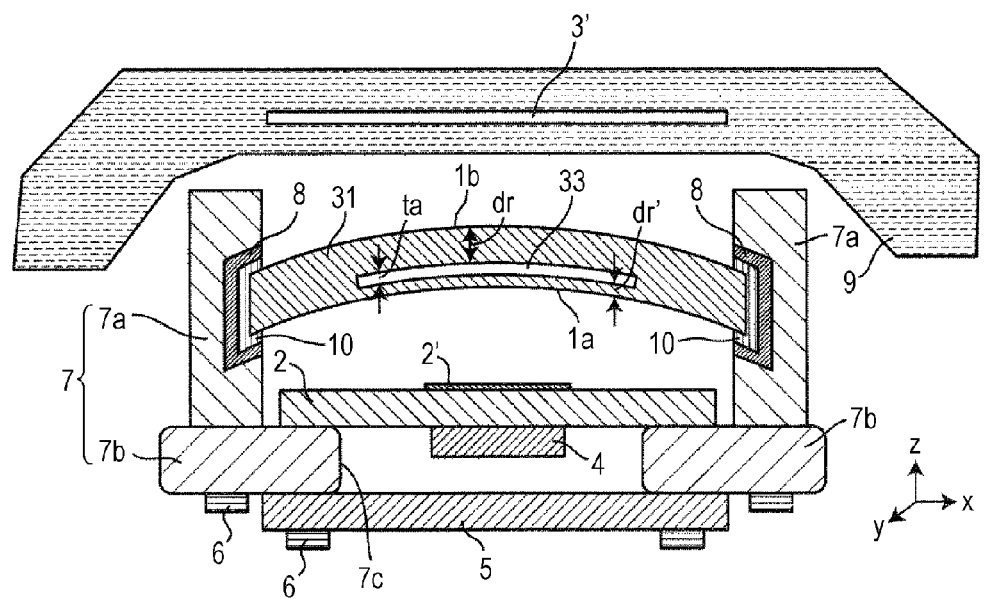
FIG. 4 is a cross-sectional view of a millimeter wave antenna according to a third exemplary embodiment of the present disclosure.

FIG. 4 is a cross-sectional view illustrating a configuration of an antenna for vehicle according to a third exemplary embodiment of the present disclosure. The antenna for vehicle of the third exemplary embodiment is formed in a similar manner to the antenna for vehicle of the first exemplary embodiment, except for a structure of radome 31. Radome 31 of the third exemplary embodiment differs from radome 1 of the first exemplary embodiment in that radome 31 is formed in a curved shape projecting forward. In radome 31 of the antenna for vehicle of the third exemplary embodiment, thickness dr' of first area 11, thickness dr of second area 12, and clearance to of gap 33 are set in a similar manner to radome 1 of the first exemplary embodiment.

Radome 31 of the third exemplary embodiment configured as described above can inhibit degradation of an antenna characteristic in a similar manner to radome 1 of the first exemplary embodiment, and can further reduce characteristic degradation at a time of beam tilt as compared with radome 1 of the first exemplary embodiment.

Although the above exemplary embodiments show the examples in which a radar apparatus for vehicle is configured by using the millimeter wave antenna according to the present disclosure, the millimeter wave antenna of the present disclosure is not limited to these examples, and can be expanded to applications such as millimeter wave wireless communications. That is, the millimeter wave according to the present disclosure includes electromagnetic waves having wavelengths used by radar apparatuses for vehicle and wavelengths used by millimeter wave wireless communications. The millimeter wave according to the present disclosure includes, for example, electromagnetic waves that have wavelengths between 1 mm and 10 mm inclusive. In addition, a shape of the gap of the present disclosure is not particularly limited. For example, the gap projected onto the first exterior surface of the radome may have various shapes such as a square, a rectangle, a circle, and an ellipse.

An millimeter wave antenna according to an embodiment of the present disclosure includes: an antenna body adapted to transmit and receive an electromagnetic wave of a millimeter wave band; and a radome that covers a transmitting and receiving surface of the antenna body. The transmitting and receiving surface and the radorm are apart from each other and have a space therebetween. The radome includes a gap adapted to allow the electromagnetic wave of the millimeter wave band to pass through the gap.

The radome may further include a first area defined by and located between a first exterior surface on an antenna side and the gap. A thickness of the first area may be adapted to allow a first reflected wave and a second reflected wave to be radiated from the first exterior surface into the space on the antenna side in different phases. The first reflected wave is part of the electromagnetic wave radiated from the antenna body. The first reflected wave is reflected from the first exterior surface. The second reflected wave is part of the electromagnetic wave radiated from the antenna body. The second reflected wave passes through the first area and is reflected from an interface between the first area and the gap.

The thickness of the first area may be adapted to allow the first reflected wave and the second reflected wave to be radiated from the first exterior surface into the space on the antenna side with a phase difference in a range of between $0.9\pi$ and $1.1\pi$ inclusive.

The radome may further includes: a first area defined by and located between a first exterior surface on an antenna side and the gap; and a second area defined by and located between a second exterior surface on a side distant from the antenna and the gap. A thickness of the second area may be adapted to allow a third reflected wave and a fourth reflected wave to be radiated into the gap in different phases. The third reflected wave is part of the electromagnetic wave radiated from the antenna body. The third reflected wave passes through the first area and the gap and is reflected from an interface between the gap and the second area. The fourth reflected wave is part of the electromagnetic wave radiated from the antenna body. The fourth reflected wave passes through the first area, the gap, and the second area, and is reflected from the second exterior surface.

The thickness of the second area may be adapted to allow the third reflected wave and the fourth reflected wave are radiated into the gap with a phase difference in a range of between $0.9\pi$ and $1.1\pi$ inclusive.

A thickness of the first area may be smaller than the thickness of the second area.

The gap may be divided into a plurality of portions.

The gap may have an area to allow at least part of the electromagnetic wave radiated from the antenna body to pass therethrough, the area being larger than a projection area when the antenna body is projected in parallel onto the first exterior surface of the radome in a radiation direction of the electromagnetic wave.

The radome may further include a laminate comprising a first dielectric plate including the first area, a dielectric frame plate that defines an outer circumference of the gap, and a second dielectric plate including the second area.

In the laminate, the first dielectric plate, the dielectric frame plate, and the second dielectric plate may be fixed to a fixing portion without being joined each other.

An outer circumference of the radome may be fixed to a fixing portion that includes a wave absorbing layer.

A radar apparatus for vehicle according to an embodiment of the present disclosure includes the millimeter wave antenna described above.

The millimeter wave antenna according to the present disclosure can also be mounted in short-distance high-speed digital wireless transmission apparatuses conforming to the WiGig standard including vehicle-mounted radars, wireless LAN apparatuses conforming to the IEEE 802.11ad standard, or millimeter wave wireless communications apparatuses such as noncompressed HD-TV video transmission, and can be used for various applications.

What is claimed is:

1. A millimeter wave antenna comprising:
an antenna including a transmitting and receiving surface, the antenna being adapted to transmit and receive an electromagnetic wave of a millimeter wave band; and
a radome that covers the transmitting and receiving surface of the antenna, the transmitting and receiving surface and the radome being apart from each other with a space therebetween,
wherein the radome comprises a gap adapted to allow the electromagnetic wave of the millimeter wave band to pass through the gap,
a first exterior surface on a side close to the antenna, and a first area defined by and located between the first exterior surface and the gap, and
a thickness of the first area is adapted to allow a first reflected wave and a second reflected wave to be radiated from the first exterior surface into the space in different phases, the first reflected wave, which is part of the electromagnetic wave radiated from the antenna, being reflected from the first exterior surface, the second reflected wave, which is part of the electromagnetic wave radiated from the antenna, passing through the first area and being reflected from an interface between the first area and the gap.

2. The millimeter wave antenna according to claim 1, wherein the thickness of the first area is adapted to allow the first reflected wave and the second reflected wave to be radiated from the first exterior surface into the space with a phase difference in a range of between $0.9\pi$ and $1.1\pi$ inclusive.

3. The millimeter wave antenna according to claim 2, wherein the gap is divided into a plurality of portions.

4. The millimeter wave antenna according to claim 2, wherein the gap has an area to allow at least part of the electromagnetic wave radiated from the antenna to pass therethrough, the area being larger than a projection area when the transmitting and receiving surface of the antenna is projected in parallel onto the first exterior surface of the radome in a radiation direction of the electromagnetic wave.

5. The millimeter wave antenna according to claim 2, wherein an outer circumference of the radome is fixed to a fixing portion that includes a wave absorbing layer.

6. The millimeter wave antenna comprising:
an antenna including a transmitting and receiving surface, the antenna being adapted to transmit and receive an electromagnetic wave of a millimeter wave band; and
a radome that covers the transmitting and receiving surface of the antenna, the transmitting and receiving surface and the radome being apart from each other with a space therebetween,
wherein the radome comprises a gap adapted to allow the electromagnetic wave of the millimeter wave band to pass through the gap,
a first exterior surface on a side close to the antenna;

a second exterior surface on a side distant from the antenna;

a first area defined by and located between the first exterior surface and the gap; and a second area defined by and located between the second exterior surface and the gap, wherein a thickness of the second area is adapted to allow a third reflected wave and a fourth reflected wave to be radiated into the gap in different phases, the third reflected wave, which is part of the electromagnetic wave radiated from the antenna, passing through the first area and the gap and being reflected from an interface between the gap and the second area, the fourth reflected wave, which is part of the electromagnetic wave radiated from the antenna, passing through the first area, the gap, and the second area, and being reflected from the second exterior surface.

7. The millimeter wave antenna according to claim 6, wherein the thickness of the second area is adapted to allow the third reflected wave and the fourth reflected wave to be radiated into the gap with a phase difference in a range of between $0.9\pi$ and $1.1\pi$ inclusive.

8. The millimeter wave antenna according to claim 7, wherein a thickness of the first area is smaller than the thickness of the second area.

9. The millimeter wave antenna according to claim 7, wherein the radome further comprises a laminate comprising a first dielectric plate including the first area, a dielectric frame plate that defines an outer circumference of the gap, and a second dielectric plate including the second area.

10. The millimeter wave antenna according to claim 9, wherein, in the laminate, the first dielectric plate, the dielectric frame plate, and the second dielectric plate are fixed to a fixing portion without being joined to each other.

* * * * *